United States Patent [19]

Falk

[11] 4,262,972
[45] Apr. 21, 1981

[54] CRAWLER TRACK FOR TRACKED VEHICLES

[75] Inventor: Alfons B. Falk, Bonassund, Sweden

[73] Assignee: Aktiebolaget Hagglund & Soner, Ornskoldsvik, Sweden

[21] Appl. No.: 15,920

[22] Filed: Feb. 28, 1979

[30] Foreign Application Priority Data

Mar. 2, 1978 [SE] Sweden ............................ 7802352

[51] Int. Cl.³ ...................... B62D 55/22; B62D 55/28
[52] U.S. Cl. ............................ 305/35 R; 305/58 PC
[58] Field of Search ................... 305/35 R, 35 EB, 53, 305/58 R, 58 PC, 36, 38

[56] References Cited
U.S. PATENT DOCUMENTS

| 3,467,446 | 9/1969 | Seelbach et al. | 305/58 X |
| 3,721,476 | 3/1973 | Andersson | 305/35 R |

Primary Examiner—David A. Scherbel
Attorney, Agent, or Firm—Cushman, Darby & Cushman

[57] ABSTRACT

An articulated crawler track comprises track links having forward and rear edges and a width dimension extending transverse to the longitudinal dimension of the track and at least two drag links provided between the forward edge of each track link and the rear edge of the adjacent track link, each drag link being articulated to each of the respective track links for movement about parallel axes which are transverse to the longitudinal dimension of the track, the drag links being spaced apart along the width dimension of the track links and being arranged within the effective width of the track links.

20 Claims, 8 Drawing Figures

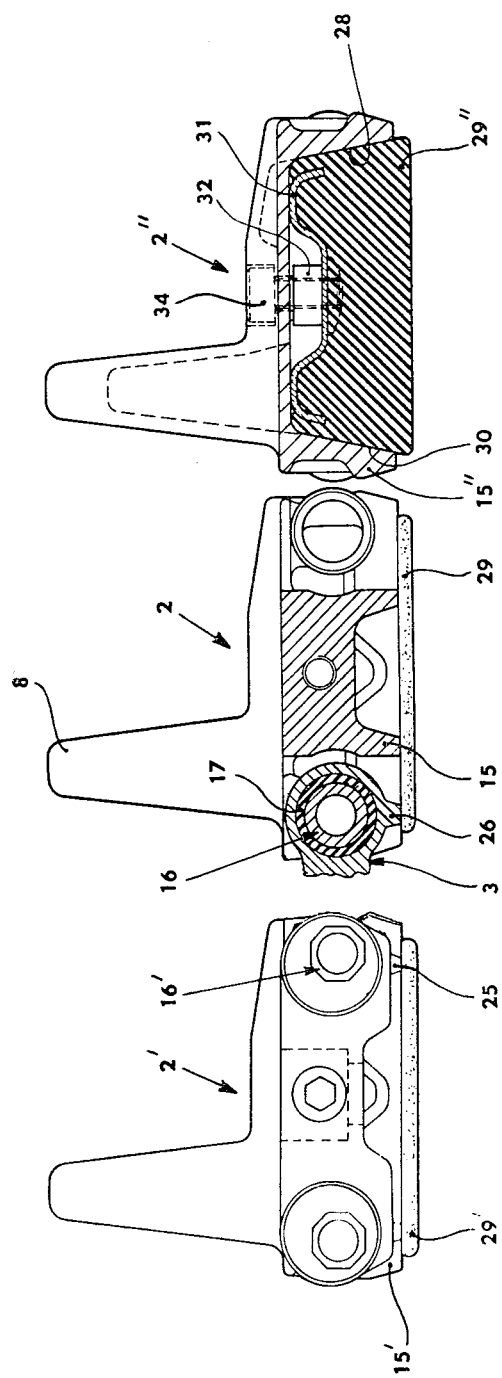

CRAWLER TRACK FOR TRACKED VEHICLES

BACKGROUND OF THE INVENTION

The invention relates to a crawler track, especially for tracked vehicles where the track includes individual articulated links interlocked with each other.

Heavy demands are made upon tracked vehicles, in particular upon heavy armoured vehicles suitable for manoeuvring under differing conditions. In this connection there is a requirement for lower weight, less power, lower vehicle height and thus for a shallower depth of track. All these factors are to a greater or lesser degree affected by each other and not least by the manner in which the track is constructed. It is thus desirable to achieve lower manufacturing and repair costs, simplified maintenance and a useful working life.

The design of track links has a not inconsiderable effect on the vehicle's weight, power requirements and size. The worse these characteristics are, the less favourable will be the vehicle's ability to operate over very uneven terrain and soft surfaces.

Many types of track have been devised and are represented amongst those selected for armoured vehicles. It has been demonstrated that a tank of about 50 tons requires a power unit of about 750 kw., and it is apparent that a tank with such a powerful engine will be large and heavy and have limited capabilities on difficult ground and on heavy going on wet clay, snow, etc., which cannot take heavy loads. The reason for the high power requirement is to a great degree related to the design of the track and its links (track plates) which absorb a noticeable amount of energy. The rubber sole below the plates becomes hot and absorbs energy because it offers too great a resistance and inadequate transmission of stress between the plates. Two adjacent plates are connected by a bolt which means that the plates are subjected to a flexing movement which consumes energy. The flexing has further importance in causing the drive wheels to absorb energy as they are not operating on a plane surface. A further disadvantage with the design is that two rubber cushions in principle cover the whole length and breadth of the track plates and thus the track is too smooth and takes a poor grip on clay surfaces compared with a surface with a tread, and exerts poor traction in wet conditions. Because each track plate has a high rubber sole, and a single track bolt is used between each track plate, the latter become thick and heavy which results in a high heavy vehicle. The height of the rubber sole and thus its greater resistance has a negative side effect; the track plates "slap" during driving, this is to say the vehicle's movement is jerky. The thickness of rubber sole under the track plates prevents the drive teeth from gripping ice or packed snow. This type of track plate and its connecting portion is constructed in one piece which results in high spares and repair costs as it is necessary to change the whole track plate when damaged, for example when the track bolt socket has worn. These sockets are of rubber, vulcanised to the track plate body. The life of these rubber sockets is short and instead of re-rubbering them, the whole track plate is replaced.

SUMMARY OF THE INVENTION

One of the main objects of the invention is to develop a type of track which eliminates the above disadvantages and gives a smoother ride, a better grip on various types of ground, a lower vehicle height and a lower weight, and which will be cheaper to manufacture and repair and will allow a reduction in the vehicle's height and in its energy requirement leading to a longer working life. These advantages are achieved primarily by a track assembled from track links having forward and rear edges extending in the width dimension of the track, wherein the forward edge of each track link is articulated to the adjacent rear edge of the adjacent track link by at least two drag links which are spaced apart along the width dimension of the track and which are arranged within the effective width of the track, each drag link being pivoted to each of the two respective track links for movement about an axis extending in the width dimension of the track. Preferably each drag link is arranged in a space formed by recesses in the adjacent edges of the two respective track links.

BRIEF DESCRIPTION OF THE DRAWINGS

The invention in the following description refers to an example similar to that in the attached diagram. The invention is however by no means limited to this example.

FIGS. 5a, 5b and 5c are section views taken on lines Va—Va, Vb—Vb and Vc—Vc, respectively, in FIG. 2.

DETAILED DESCRIPTION

Figure 1:
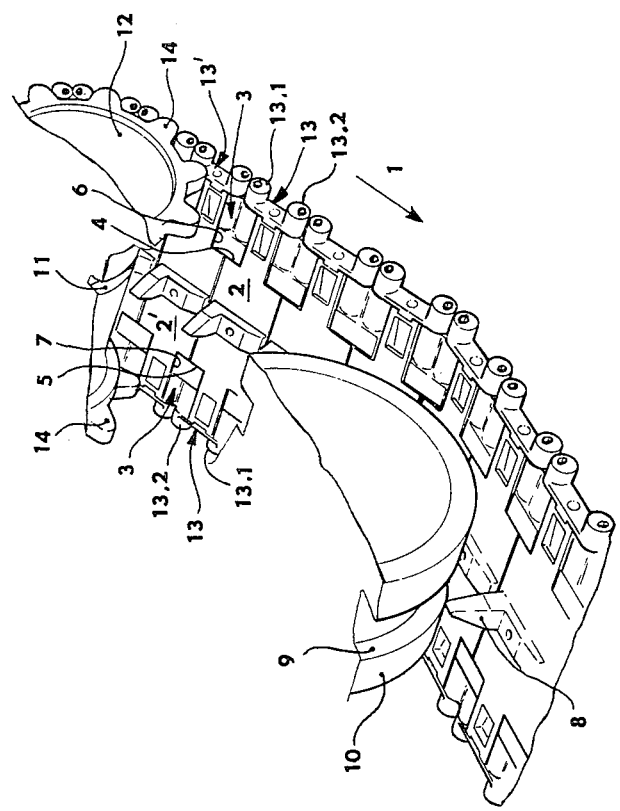
FIG. 1 is a perspective diagram of a type of track according to the invention.

The track 1 shown in FIG. 1 consists of several links (track plates) 2, which are connected to each other by two drag links generally shown at 3, and lying in recesses 4 and 5 in the edge of the link 2 and in recesses 6 and 7 in the leading edge of the link 2, behind. Each track link 2 has on its inner surface a tooth 8, which runs in a groove 9 on a plurality of idler wheels 10, of which one is shown and in the groove 11 in a drive wheel 12. A flange 13 with lugs 13.1 and 13.2 is located at each end of the track link 2. The drive wheel 12 with teeth 14 engage with the faces of lugs 13.1 and 13.2.

FIGS. 2-6 show more clearly how the track links are constructed.

The drag links 3 do not project laterally beyond the side edges of the track link 2. Rather, the drag links are situated within the width (i.e. the horizontal dimension which is transverse to the longitudinal dimension of the track 1) of the track link 2, see FIGS. 2-4, and flush with the body 15, 15' and 15" of the track link 2, 2' and 2" so that they lie horizontal to each other, see FIG. 5.

In order to improve the driving qualities of the track 1 and to allow the idler wheel 10 to run on a more or less even surface and avoid the flexing of the link 2 and reduce the vibration and energy loss in the track 1 and idler wheel 10, the drag link 3 is provided with a double joint between track links 2 and 2'. Each drag link 3 thus has a first axle or link rod 16 connected to track link 2 and a second axle or link rod 16' connected to the adjacent track line 2'. Track links 2 and 2" are jointed in the same way.

Each of the link rods (track bolts) 16, 16' are positioned generally at right angles to the length of the track.

Each link rod 16, 16' has a vulcanised rubber sleeve 17 and 17' pressed into the body 18 of the drag link 3.

Figure 6:
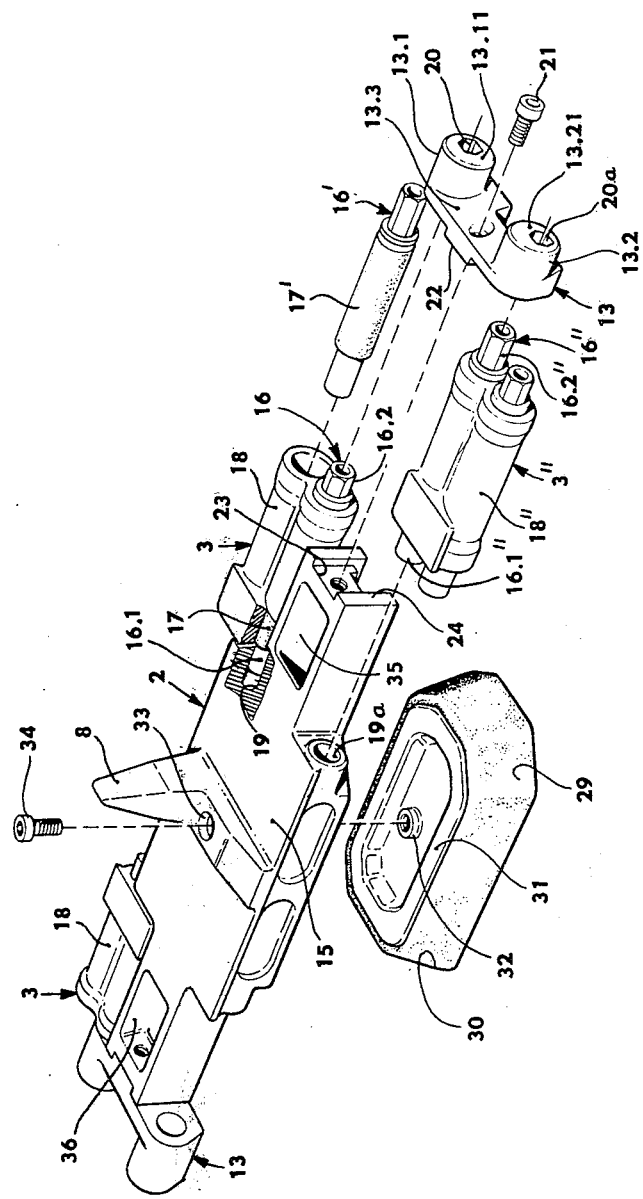
FIG. 6 is an exploded perspective view of a track link and its component parts.

The inner cylindrical end 16.1 of the link rod 16 is pushed into a socket 19 in the body 15 of the link 2 (see FIG. 2) and the other (outer) hexagonal end 16.2 is pushed into a socket 20 in a corresponding flange 13 on track link 2 (see FIG. 6). The design of the link rod 16 with a cylindrical section 16.1 and a hexagonal section 16.2 is to make the link rod 16 resistant to turning against the resilience of the rubber sleeve 17 and the body 18 of the drag link 3, and easy to assemble and dismantle.

The flange 13 is removably secured to the body 15 by a screw 21. Turning of the flange 13 relative to the body is prevented by a tongue 22 on the flange which fits into a groove 23 in the body.

The outer link rod 16' is constructed in the same manner with socket 19' in the body 15' of the link 2' and corresponding flange 13' (not completely shown).

The link rod, which is associated with an adjacent track link 2', is identified as 16" and has its cylindrical end 16.1" fitted in socket 19a in body 15 of track link 2 and with its hexagonal end 16.2" in socket 20a in the flange 13 (see FIG. 6).

The lugs 13.1 and 13.2 on the flange 13 are cylindrical about axes which are transverse to the track's direction of movement. To increase the thickness of each lug 13.1 and 13.2 to resist wear which occurs in driving the track, the hexagonal holes 20, 20a are eccentrically positioned in the lugs 13.1 and 13.2 to provide a thickening of the lug body 13.11 and 13.21 in the direction in which the teeth move. The thickening 13.11 and 13.21 lie on opposite sides of their holes 20, 20a in order to obtain longer service of flange 13, track 1 and track link 2. An additional advantage is that track 1 can be used for much longer as the main wear is transferred from one lug 13.1 to the other 13.2.

Because of the positioning of drag link 3 and link rods 16 and 16", track 1 is resistant to torsional and lateral stress which reduces the risk of twisted tracks to a minimum.

The underside of each drag link 3 (see FIG. 4) is equipped with two steel treads 25, 26 with a hard-wearing projection 27. The treads 25 and 26 are obliquely positioned and make close contact with the ground, to transmit greater pressure and improve the traction of track 1. This has the advantage that it increases the grip on the road surface particularly in a lateral direction and when driving on icy roads or packed snow.

In a central recess 28 (see FIGS. 4, 5 and 6) on the underside of the track link 2, which has a dimension in the direction of travel somewhat less than the corresponding dimension of the track link 2 and a width of approximately one third of the width of the track link 2, there is a removable wearing pad 29 of a softer material than the track link 2, e.g. rubber. This pad 29 has sloping sides 30 and a vulcanised stiffening plate 31 which has a nut 32 welded at its center point. The wearing pad 29 with its stiffening plate 31 is secured to the track link 2 by a bolt 34 screwing into a boss 32 through a hole 33 in the track link 2. Because the wearing pad 29 is removable it is possible to replace it with studs or exchange the rubber wearing pad 29 with a steel plate with spikes.

The underside of the wearing pad 29 extends below the under surface of track link 2 and becomes the wearing surface in contact with the ground. In one version the wearing pad 29 is about 7 mm. below the surface of track link 2 which gives less yield in the wearing pad 29 and thus less flexing of the track link 2 compared with known types where the wearing pad is about 30 mm. below the track link.

Because of the low profile of track link 2 and with the drag link 3 set in recesses 4, 5 in the track link 2 and recesses 6 and 7 in track link 2' and the shallow wearing pad 29, a lower weight and a lower overall height is achieved by the track 1.

The high pressure on the treads 25, 26 and the effect on the surface of the wearing pad 29 and track 1 causes the idler wheel 10 to rotate evenly and reduces vibration which, together with the low weight on track ink 2, reduce the vibration level from the track 1 drive wheel 12 and geared wheel (not shown).

Figure 4:
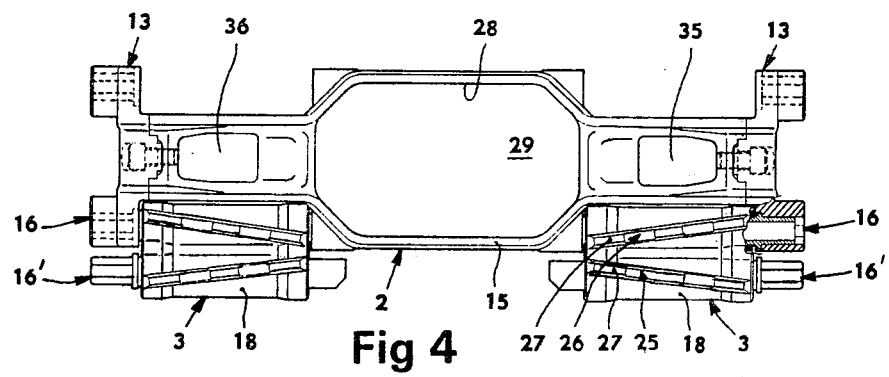
FIG. 4 is a bottom view of a track link partly cut away.
Figure 3:
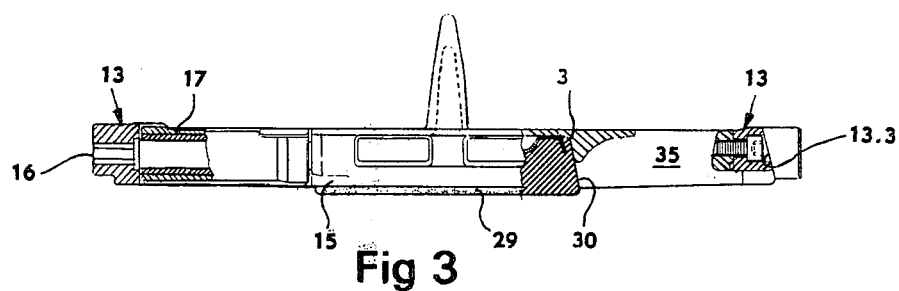
FIG. 3 is a side view of a track link partly cut away along III—III in FIG. 2.
Figure 2:
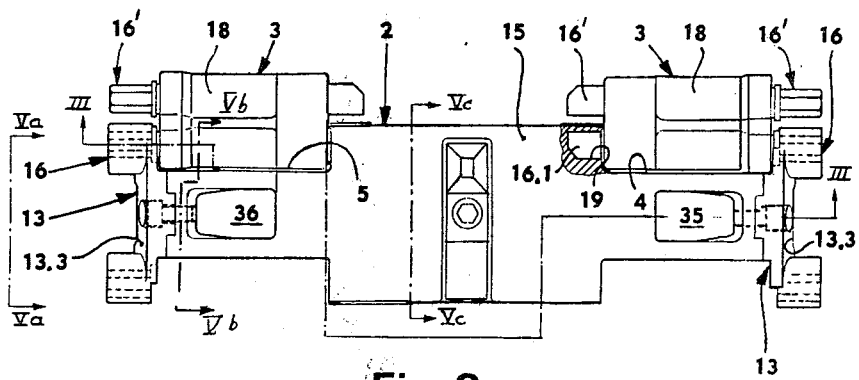
FIG. 2 is a plan view of a track link.

Track link 2 has two large holes 35 and 36 in body 15 which help to prevent digging in and give greater manoeuvrability on loose surfaces and when driving in the wet conditions which render the wearing pad 29 ineffective, (see FIGS. 2-4).

In order to avoid the teeth 14 jamming against the faces of lugs 13.1 and 13.2 on the flange 13 the edge surface 13.3 is inclined upwards, see FIGS. 2, 3 and 6.

The track link 2 described has, as mentioned above, a low profile, in one version about 60 mm., compared to about 100-120 mm. in known designs for heavy armoured vehicles. This low profile gives better handling, lower total weight and thus less mass to accelerate and lower power requirement.

Track 1 gives lower surface pressure, less ground compression and the porosity of the ground has less effect because the track is broad and distributes the weight better. Traction on the ground is high because of the shape of the track link 2, slipping is minimised and firm ground is better employed.

Track 1 dissipates less energy for a vehicle because of the aforementioned low weight, good surface distribution over the wearing pad 29 to the ground, less resilience, rigid construction, less wheel judder, lower profile. This enables the selection of an engine of lower power.

The design of the track 1 results in a long working life and repair and replacement costs are reduced in comparison with known types. The parts which wear, namely, the wearing pad 29, the drag links 3 and link rods 16 and sleeves 17, together with the flanges 13 are easily replaced and cost less than a complete track link.

What is claimed is:

1. An articulated track comprising track links having forward and rear edges and a width dimension extending transverse to the longitudinal dimension of the track and at least two drag links provided between the forward edge of each track link and the rear edge of the adjacent track link, means articulating each drag link to each of the respective track links for movement about parallel axes which are transverse to the longitudinal dimension of the track, said drag links being spaced apart along the width dimension of the track links and being arranged within the effective width of the track links each track link having a body portion and a side flange portion and said articulating means being link rods, one end of each link rod being positioned in a socket in a track link body and the other end being positioned in a socket in the corresponding track link flange.

2. A track as in claim 1 or 19 wherein when said track links lie in a horizontal plane, said drag links lie in a horizontal plane.

3. A track as in claim 1 wherein said flange portion is removably secured to the respective body portion.

4. A track as in claim 3 wherein turning of the flange relative to the respective body is prevented by a tongue on one of said portions and a groove on the other portion.

5. A track as in claim 5 wherein each flange portion has two lugs adapted to be engaged by the teeth of a drive wheel.

6. A track as in claim 5 wherein the sockets in each flange are formed in said lugs.

7. A track as in claim 6 wherein the sockets in each flange and the corresponding ends of the link rods are hexagonal.

8. A track as in claim 7 wherein the sockets are eccentrically positioned in said lugs.

9. A track as in claim 8 wherein the thicker portions of the lugs, resulting from the eccentric sockets, are disposed on opposite sides of their respective sockets.

10. A track as in claim 1 wherein said side flange portions have outer edge surfaces which are inclined, when viewed from a ground-engaging position, upwardly and inwardly.

11. A track as in claim 1 or 19 wherein the track links are provided with wearing pads which have a width dimension which is about one-third of the width dimension of the track links.

12. A track as in claim 11 wherein the edges of the wearing pads, when viewed in a ground-engaging position, slope upwardly and inwardly.

13. A track as in claim 11 wherein each wearing pad is vulcanised to stiffening a plate and is secured to the respective track link by at least one bolt.

14. A track as in claim 11 wherein the wearing pads project about 7 mm. beyond the surfaces of the track links.

15. A track as in claim 1 wherein the drag links lie in line with the bodies of the respective track links when they lie horizontally against each other on the surface of the ground.

16. A track as in claim 1 wherein each track link is provided with a single wear pad arranged on the longitudinal center line of the respective track link.

17. A track as in claim 15 wherein said treads are oblique with respect to said drag links.

18. A track as in claim 15 wherein said treads have hard-wearing projections.

19. A track as in claim 1, wherein each drag link is arranged in a space formed by recesses in the forward and rear edges of the respective track links.

20. An articulated track comprising track links having forward and rear edges and a width dimension extending transverse to the longitudinal dimension of the track and at least two drag links provided between the forward edge of each track link and the rear edge of the adjacent track link, said drag links having treads projecting from their outer surface, means articulating each drag link to each of the respective track links for movement about parallel axis which are transverse to the longitudinal dimension of the track, said drag links being spaced apart along the width dimension of the track links and being arranged within the effective width of the track links.

* * * * *